United States Patent [19]
Zuffada et al.

[11] Patent Number: 5,095,363
[45] Date of Patent: Mar. 10, 1992

[54] METHOD OF DEMODULATING MULTI-STANDARD TV SIGNALS AND A CIRCUIT DEVICE FOR IMPLEMENTING THE METHOD

[75] Inventors: Maurizio Zuffada, Milan; Fabrizio Sacchi, Gambarana-Pavia; Gianfranco Vai, Pavia; Giorgio Betti, Milan; Silvano Gornati, Casorezzo-Milan, all of Italy

[73] Assignee: SGS-Thomson Microelectronics S.r.L., Italy

[21] Appl. No.: 549,610

[22] Filed: Jul. 9, 1990

[30] Foreign Application Priority Data

Jul. 10, 1989 [IT] Italy ................. 21136 A/89

[51] Int. Cl.$^5$ .................... H04N 9/65; H04N 5/44
[52] U.S. Cl. .................... 358/23; 358/188; 358/191.1; 329/316; 329/348; 329/323; 329/358; 455/188; 455/209
[58] Field of Search ............... 358/198, 197, 196, 143, 358/23, 188, 189, 191.1, 192.1, 193.1, 195.1; 455/187, 188, 181, 191, 209; 329/316, 348, 323, 358; 370/120, 121

[56] References Cited

U.S. PATENT DOCUMENTS

| | | | |
|---|---|---|---|
| 4,551,756 | 11/1985 | Ogawa et al. | 358/197 |
| 4,758,794 | 7/1988 | Ogawa | 358/23 X |

FOREIGN PATENT DOCUMENTS

| | | | |
|---|---|---|---|
| 1397603 | 3/1976 | Austria | 388/198 |
| 3346981 | 7/1985 | Fed. Rep. of Germany | 358/198 |

Primary Examiner—James J. Groody
Assistant Examiner—Michael H. Lee
Attorney, Agent, or Firm—Leydig, Voit & Mayer

[57] ABSTRACT

A method of demodulating multi-standard TV signals consists of providing a plurality of signals at a frequency which is a multiple of a reference frequency whose value is a common submultiple of the frequencies of the multi-standard signals. Thereafter, the signal to be demodulated is multiplied by one of said plural signals having a frequency which differs therefrom by a value equal to the reference frequency; by filtering the result of the multiplication, a signal is obtained at the reference frequency but corresponding in amplitude to the one to be demodulated.

5 Claims, 2 Drawing Sheets

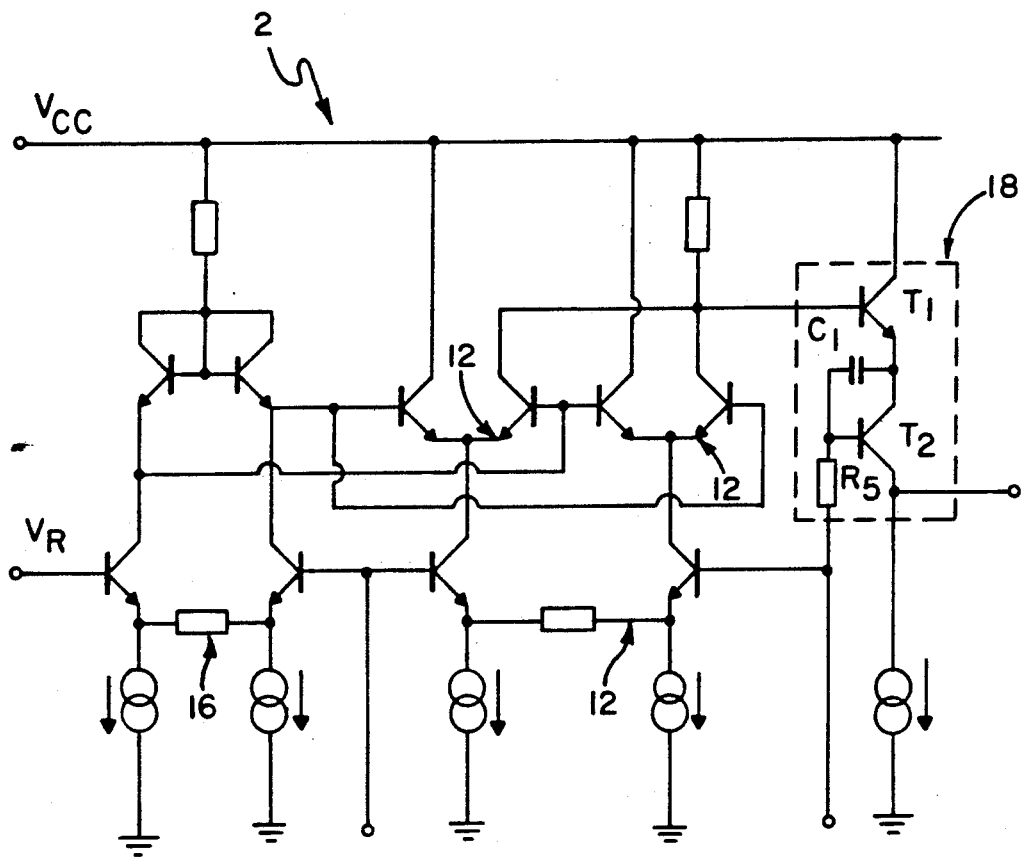
FIG. 2
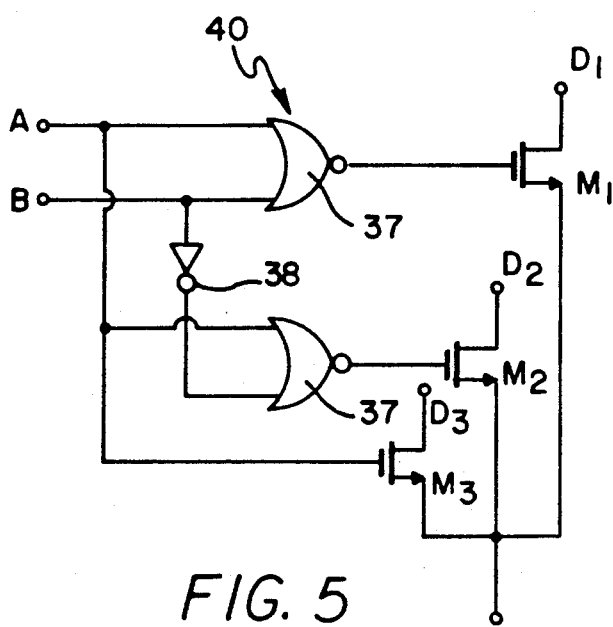
FIG. 5
| A | B | |
|---|---|---|
| 0 | 0 | $V_4(t)$ |
| 0 | 1 | $V_6(t)$ |
| 1 | 1 | $V_7(t)$ |
| 1 | 0 | $V_7(t)$ |
FIG. 6

METHOD OF DEMODULATING MULTI-STANDARD TV SIGNALS AND A CIRCUIT DEVICE FOR IMPLEMENTING THE METHOD

This invention relates to a method of demodulating multi-standard TV signals, and to a circuit device for implementing the method.

Tv receiver sets of the multi-standard type, that is capable of demodulating TV signals broadcast in accordance with the standards enforced in different countries, include receiver systems which are highly complicated and expensive.

Specifically, the need for demodulating the different audio carriers associated with the different standards, is forcing the manufacturers of TV sets to use a number of frequency modulation (FM) demodulators equal to the number of the standards to be demodulated thereby. This has a major drawback in that a large number of switches must be provided to enable eact time the appropriate demodulator.

In essence, a switch must be provided both upstream of and downstream from each demodulator to each time establish the connection between said FM demodulator and an intermediate frequency (IF) demodulator, at an upstream location, and an audio amplifier at a downward location.

The prior art has also proposed another solution which provides a single FM demodulator in combination with a plurality of crystal-controlled reference oscillators equal in number to the number of the standards to be demodulated.

However, this prior solution has proved to be too expensive, owing to the provision of a large number of crystal-controlled oscillators independent of one another and of a correspondingly large number of switches for their connection to the single demodulator.

The technical problem that underlies this invention is to provide a method of demodulating multi-standard TV signals, and a circuit device therefor, which have such respective functional and structural characteristics as to permit of operation on a single FM demodulator and a single crystal-controlled oscillator, wherein said circuit device may be provided as an integrated circuit having a reduced number of input/output pins.

This problem is solved according to the invention by a method of demodulating multi-standard TV signals consisting of, providing a plurality of signals whose frequency is a multiple of a reference frequency having a value which is a common submultiple of the frequencies of the multi-standard signals, multiplying the signal to be demodulated by one of said plural signals having a frequency which differs therefrom by a value equal to the reference frequency, and filtering the multiplication result to obtain a signal at the reference frequency, but corresponding to the signal to be demodulated.

This problem is also solved by a circuit device for demodulating multi-standard TV signals having different audio carrier frequencies, characterized in that it comprises a multiplexer selector having plural inputs adapted to receive respective signals at a frequency which is a multiple of a reference frequency and an output connected to an input of a frequency multiplier having a second input to receive the signal Vi(t) to be demodulated, and a band-pass filter connected to the multiplier output to filter all the signals at different frequencies from the reference frequency, said multiplexer having further selection inputs for directing one of said input signals to output according to the type of the signal to be demodulated.

The features and advantages of the method according to the invention will be more clearly understood from the following detailed description of an exemplary embodiment thereof, given by way of illustration and not of limitation with reference to the accompanying drawings which depict a circuit device operating in accordance with this method.

In such drawings:

FIG. 2 shows a detail wiring diagram of the device in FIG. 1;

FIGS. 3 to 5 show respective diagrams of details of the device in FIG. 1; and

FIG. 6 shows a so-called truth table relating to the detail shown in FIG. 5.

Figure 1:
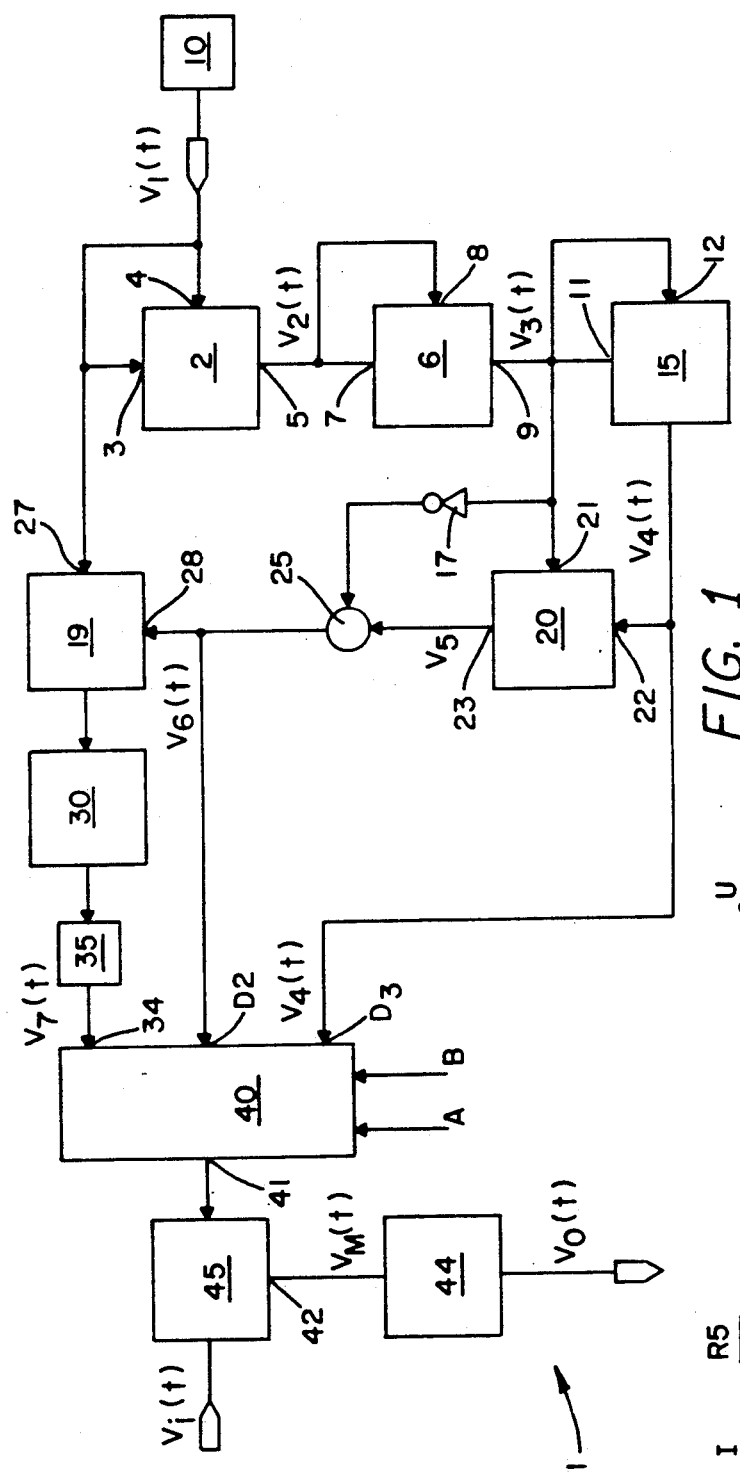
FIG. 1 shows, in block diagram form, a circuit device according to the invention.

With reference to the drawing views, generally and schematically shown at 1 is a circuit device embodying this invention for demodulating multi-standard TV signals.

The device 1 is specifically intended for demodulating an input signal, being denoted by Vi(t) and modulated in frequency modulation (FM), independently of the value of the audio carrier frequency as typical of the various multi-standard video signals.

As an example, with the US standard (M) the audio carrier frequency is 4.5 MHz, the European standard (B/G) the frequency is 5.5 MHz, the British standard (I) is 6 MHz, and with the additional Euro-Asiatic standard (D/K) the audio carrier frequency is 6.5 MHz.

Said input signal Vi(t) is an FM-modulated audio carrier to be demodulated whose mathematic expression is defined by the following formula:

$$Vi(t) = Va * cos[2\pi fot + (\Delta f/fm) * sin 2\pi fmt]$$

where,

Va is the amplitude of the audio frequency;

fo is the frequency of the audio carrier;

Δf is the maximum departure of the frequency produced by the modulating signal on the audio carrier; and fm is the generic modulating audio frequency.

According to this invention, in order to carry out the conversion, a reference signal, indicated at V1(t), is required which consists of a pure oscillation at a frequency f1 of 500 kHz, and having a stable frequency and distortion characteristic below 1%.

Such a signal is provided by a crystal-controlled oscillator, indicated at 10 and having a high merit factor Q to assure of said frequency stability.

The circuit device 1 comprises a first linear multiplier 2 having a pair of inputs 3 and 4, and an output 5. Applied to each input is said reference signal V1(t) to output, on the output 5, a signal V2(t) obtained by multiplying the input signal by itself.

The structure of the multiplier 2, as well as those of the other multipliers incorporated to the device 1 and mentioned hereinafter, is known per se and depicted diagramatically in FIG. 2. This multiplier consists of differential cells 12 connected together in a so-called Gilbert cell configuration functioning as a four-quadrant multiplier and being associated with a structure 16 of adjustment for distortion according to an inverse characteristic of hyperbolic tangent line.

This scheme is described, for example, on pages 561-569 of a book entitled "Analysis and Design of Analog Integrated Circuits".

The single difference resides in the provision of a high-pass filter 18 composed of the transistors T1 and T2, capacitor C1, and resistor R5. A generic signal V(t) applied to the input pair of the multiplier would be multiplied by itself to output a fresh signal comprising two terms, of which the first is a continuous component filtered through the filter 18, and the second is a component at twice the frequency of the input signal and a phase displaced 90° owing to the RC circuit provided.

Thus, at the output 5 of the multiplier 2 there will appear a signal V2(t) having twice the frequency of the reference signal V1(t), i.e. of 1 MHz.

The device 1 comprises a second, linear multiplier 6 having, in turn, two inputs 7, 8 and an output 9. The signal from the output 5 is applied to each of these inputs 7 and 8 such as to produce on the output 9 a signal V3(t) at a 2 MHz frequency, resulting from the product of the signal V2(t) by itself.

In a similar manner, a third, linear multiplier 15 having two inputs 11 and 12 will receive the signal output by the second multiplier 6 and produce on its one output 13 a further signal V4(t) at 4 MHz.

A fourth multiplier 20, having respective inputs 21 and 22, will receive, on the one side, the signal V3(t) on the output 9 of the second multiplier 6, and on the other side, the signal V4(t) output by the third multiplier 15. In particular, said fourth multiplier 20 has twice the gain of the other two, 6 and 15, described hereinabove. The fourth multiplier 20 has the output 23 connected to a summing node 25 to which the output 9 of the second multiplier 6 is also Ledvia a negator 17. On the output of the node 25 is a signal V6(t) at 6 MHz.

Further provided is a fifth multiplier 19 adapted to receive, on its respective inputs 27 and 28, the signal V6(t) output by the node 25 and the reference signal V1(t). This multiplier 19 has no filter 18 because no continuous component appears at its output.

Figure 4:
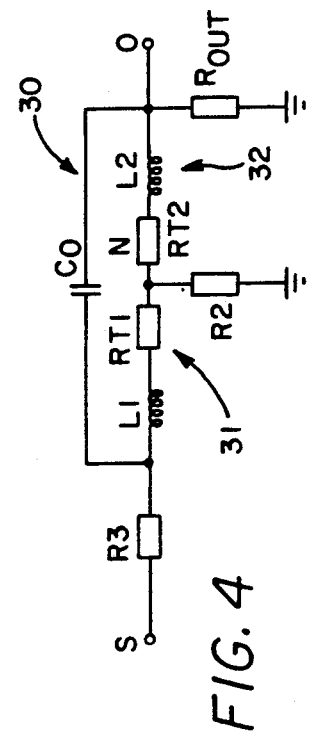

The fifth multiplier 19 has its output connected directly to a so-called trap circuit 30, shown diagramatically in FIG. 4. This circuit 30 is basically a filter at a predetermined frequency and operating within a very narrow band about this frequency. For the purposes of this invention, that frequency is thirteen times as high as the frequency f1 of the reference signal V1(t) and equal to 6.5 MHz.

The circuit 30 comprises a first series 31 of an inductance L1 and a resistance RT1. This series 31 is connected between a low-inductance input terminal S, via a resistor R3, and a circuit node N. A resistor R2 is connected between said node N and ground. A second series 32 of an inductance L2 and a resistance RT2 is connected between said node N and a high-impedance output terminal 0; between the terminal 0 and ground, there is connected a resistor Rout. A capacitor Co is parallel connected to the two series 31 and 32.

Connected to the output of the circuit 30 is an amplifier 35 on the output whereof is a signal V7(t), applied to an input 34 of a conventional multiplexer selection device 40 which is depicted diagramatically in FIG. 5 as having a pair of negated OR gates 37, a negator 38, and respective MOS transistors M1, M2, and M3 arranged to receive, or their drain electrodes, corresponding input signals of the multiplexer 40.

Specifically, the drain D1 of transistor M1 is connected to the output of amplifier 35, the drain D2 of transistor M2 is connected to the output of the summing node 25 and receives the signal V6(t), whilst the drain D3 of transistor M3 receives the signal V4(t) output by the third multiplier 15.

The multiplexer 40 has a pair of selection inputs A and B, whereby the emission and shunting of the signal Vu(t), on the multiplexer output 41, can be controlled on the grounds of a so-called truth table, shown in FIG. 6.

The output 41 of the multiplexer 40 is connected to one of the two inputs of a sixth multiplier 45, which receives the FM-modulated signal Vi(t) to be demodulated on the other of its inputs.

The output 42 of the last-named component is connected directly to the input of a band-pass filter 44 adapted to filter out all the signals at different frequencies from the reference frequency f1 of 500 kHz.

Figure 3:
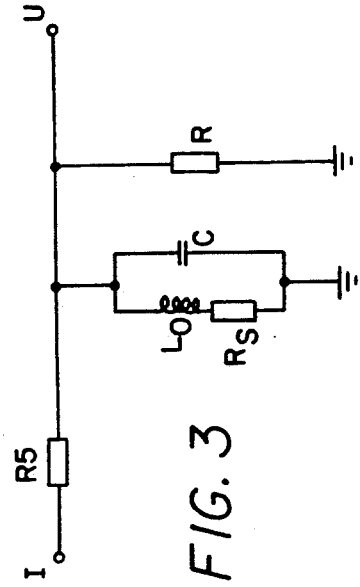

The circuit construction of the filter 44 is shown in FIG. 3 and comprises a series connection, between an inductance Lo and a resistance Rs, inserted between a low-impedance input terminal I and a high-impedance output terminal U of the filter 44.

More specifically, this series connection has one end connected between said terminals and the other end connected to ground, a second resistance Rs intervening between the input terminal I and said one end.

A capacitor C and resistor R are associated in parallel with said series connection.

The construction of the filter 44 and trap circuit 30 is accomplished using specific circuit-making techniques which allow the inductances incorporated thereto to be integrated.

The demodulation method of this invention will be now described.

Where the signal Vi(t) to be demodulated, received at the device 1 input, is the audio carrier to the US standard (M) having a carrier frequency fo of 4.5 MHz, it will suffice to drive, to both of the selection inputs A, B of the multiplexer 40, a logic 0 value as shown in the chart of FIG. 6.

Accordingly, on the output 42 of the multiplexer 40, the signal V4(t) output by the third multiplier 15 will be selected. In this way, a linear multiplication is performed in the sixth multiplier 45 between the input signals to produce a signal Vm(t) having two different frequency components, of which will correspond to the reference frequency f1 of 500 kHz.

That component at reference frequency, indicated at Vo(t), is obtained at the output of the band-pass filter 44 operative to filter out the other signal components.

By suitable adjustment of the gain of the linear multiplier 45, downstream from the multiplexer 40, the output signal Vo(t) can be made to exactly correspond in amplitude to the FM-modulated input signal Vi(t), but displaced to a frequency f1 of 500 kHz.

That signal Vo(t) can then be supplied to a demodulator operating at 500 kHz.

Where the signal Vi(t) to be demodulated is instead the audio carrier to the European standard B/G having a carrier frequency fo of 5.5 MHz, by selecting for the input A of the multiplexer 40 a logic 0 value and for the other input, B, a logic 1 value, the signal V6(t) output by the summing node 25 is transferred to the output 42.

Consequently, a linear multiplication is again performed in the multiplier 45 between the signals present at its inputs to once again output a signal which contains at least one component at the reference frequency f1.

Any phase displacement of the output signal would not affect the FM demodulation, and hence the quality of the audio signal in the base band, it being independent of the time parameter.

The circuit device of this invention enables, in essence, any FM-modulated audio signal on different carriers corresponding to the various world TV standards to be converted and reduced to a single reference frequency.

Thus, the great advantage is afforded of using a single FM demodulator and single crystal-controlled oscillator to demodulate any types of TV standards.

We claim:

1. A method of demodulating multi-standard TV signals comprising the steps of:
   providing a reference signal having a stable reference frequency which is a common submultiple of the frequencies of the multi-standard signals;
   generating from said reference signal a plurality of signals each having a frequency which is a multiple of said reference frequency;
   multiplying a signal to be demodulated by one of said plurality of signals having a frequency which differs therefrom by a value equal to the reference frequency;
   filtering a signal resulting from said multiplying step to obtain a frequency-modulated signal at the reference frequency with a frequency modulation corresponding to that of the signal to be demodulated; and
   demodulating said frequency-modulated signal.

2. A circuit device for demodulating multi-standard TV signals having different audio carrier frequencies comprising:
   a generator of a reference signal having a stable reference frequency which is a common submultiple of the carrier frequencies of the multi-standard signals;
   circuit means adapted to generate from said reference signal a plurality of signals each having a frequency which is a multiple of said reference frequency;
   a multiplexer selector having a plurality of input terminals connected to said circuit means so as to receive each respective one of said plurality of signals, said multiplexer selector also having an output terminal and selection input terminals for directing one of said input signals to said output terminal according to the type of the TV signal to be demodulated;
   a frequency multiplier having a first input terminal connected to said output terminal of said multiplexer, a second input terminal adapted to receive a signal to be demodulated, and an output terminal;
   a band-pass filter connected to the multiplier output to filter out any signal having a frequency different from the reference frequency, so as to provide at its output terminal a frequency-modulated signal at the reference frequency with a frequency modulation corresponding to that of the signal to be demodulated; and
   a demodulating circuit connected to said output terminal of said band-pass filter to demodulate said frequency-modulated signal.

3. A device according to claim 2 wherein said circuit means comprises a series of linear multipliers, each having a pair of inputs cascade connected together to produce on their respective outputs a corresponding series of signals at a frequency which is a multiple of said reference frequency, said signals being then supplied to the respective inputs of said multiplexer.

4. A device according to claim 3, characterized in that it comprises a trap circuit connected to the output of one of said multipliers to filter a signal at a predetermined frequency value being an odd multiple of said reference frequency.

5. A device according to claim 3, characterized in that it comprises an amplifier connected between the output of said trap circuit and the corresponding input of said multiplexer.

* * * * *